March 15, 1949.

H. J. NICHOLS

2,464,601

AUTOMATIC PERFORATED TAPE
READING CONTROL SYSTEM

Filed Sept. 7, 1944

INVENTOR
Harry J. Nichols
BY
Blair, Curtis & Hayward
ATTORNEYS

March 15, 1949.  H. J. NICHOLS  2,464,601
AUTOMATIC PERFORATED TAPE
READING CONTROL SYSTEM
Filed Sept. 7, 1944  5 Sheets-Sheet 4

INVENTOR
Harry J. Nichols
BY
Blair, Curtis + Hayward
ATTORNEYS

March 15, 1949.  H. J. NICHOLS  2,464,601
AUTOMATIC PERFORATED TAPE
READING CONTROL SYSTEM
Filed Sept. 7, 1944  5 Sheets-Sheet 5

INVENTOR
Harry J. Nichols
BY
Blair, Curtis & Hayward
ATTORNEYS

Patented Mar. 15, 1949

2,464,601

UNITED STATES PATENT OFFICE 2,464,601

AUTOMATIC PERFORATED TAPE READING CONTROL SYSTEM

Harry J. Nichols, New York, N. Y., assignor to International Business Machines Corporation, New York, N. Y., a corporation of New York Application September 7, 1944, Serial No. 552,991

8 Claims. (Cl. 178—17)

This invention relates to a code-translator system, and more particularly to the reading of code which is perforated in tape.

An object of this invention is to provide apparatus for reading a code from tape, and for producing signals or other effects in response to the code designation. A further object is to provide apparatus for interpreting the code on the tape where the apparatus is automatic during normal operation but is stopped automatically in response to a specified signal. A further object is to provide for the automatic stopping of apparatus of the above character when the tape is too taut, or when it breaks or runs out.

A further object is to provide apparatus of the above character which is compact, quite, simple and durable, and which will function accurately over long periods without servicing. A further object is to provide apparatus of the above character which is inexpensive to manufacture, both with regard to materials used and with regard to tool cost. A still further object is to provide tape-handling means which will not damage the tape. These and other objects will be in part obvious and in part pointed out below.

The invention accordingly consists in the features of construction, combinations of elements, and arrangements of parts as will be exemplified in the structure to be hereinafter described and the scope of the application of which will be indicated in the following claims.

The illustrative embodiments of the invention are units for reading a code perforated in tape, and for producing electrical signals corresponding to the code; the signals may be used at the station where they are produced by the tape reader or they may be transmitted to another station, and may operate an electric typewriter or other devices. For example, the tape reader may be used to perforate a duplicate tape with a tape punch of the type disclosed in my copending application. In this way, a tape bearing a coded message may be used repeatedly to retype original subject matter or to produce duplicate tape, and if desirable, the signals may be transmitted simultaneously by wire or by radio to another station where the signals may be used for any desired purpose. Under some circumstances, the coded signals may be transferred to tabulating cards, either numeric or alphabetic, and then the cards may be used in the usual manner.

Illustratively, the tape reader is used with a six-unit code, or with any other suitable code; the signals for each character are read simultaneously or serially depending upon the coding system and the use to which the signals are to be put. The particular tape reader herein disclosed includes means to automatically stop the tape feed in response to a special code hole in the margin of the tape; thus, for example, inserts may be made in the subject matter as it is being reproduced by a typewriter. Furthermore, the tape reader stops automatically if the tape runs out, or if the feed is too slow or is interfered with. In each case, the tape is handled so as to avoid mutilation of the signals and so as to avoid injury to the tape, particularly during the starting and stopping of the apparatus and during the reading operation.

The mechanism is compact, quiet, simple, and durable and it will function accurately over long periods of time without servicing. Furthermore, the cost of the apparatus is low and the apparatus is especially suited for mass production. The illustrative embodiments of the invention are particularly adapted to form integral parts of a coordinated typing and signalling system which may include several stations remote from each other; each such station would include a tape reader, one or more tape punches, one or more electric typewriters, and such other translating, transmitting and receiving mechanism as is necessary to operate the various devices in a coordinated manner and to connect the various stations together.

The tape reader functions on the principle of drawing the perforated tape intermittently past a reading station with the tape being stopped momentarily each time that a row of code holes is at the reading station, and oscillating a series of seeker pins against the tape at the station each time that the tape is stopped, whereupon the ends of the pins which are aligned with punched code holes pass through the tape with the result that corresponding signal contacts are closed. Thus, for each hole punched in the portion of the tape which is positioned at the reading station, a circuit is completed and a code impulse is produced; these code impulses are combined to form the code signal which is used for control purposes as outlined above.

The tape is moved past the reading station by a sprocket roll actuated by an intermittent worm-feed. The seeker pins are carried on oscillator levers which are actuated by a multiple cam-and-spring assembly, the operation of which is coordinated with the intermittent worm-feed. The multiple cam-and-spring assembly and the worm-feed are driven by a single electric motor, and an electromagnet operated clutching means is provided to disconnect the driven parts from the motor so as to arrest the movement of the tape without stopping the motor. The clutching means is so operated that at the time of stopping the tape, the seeker pins are withdrawn from the tape. The multiple cam-and-spring assembly in the preferred embodiment operates the seeker pins simultaneously, but in a second embodiment the seeker pins are operated sequentially so as to produce a series of impulses for each code signal.

Figure 1:
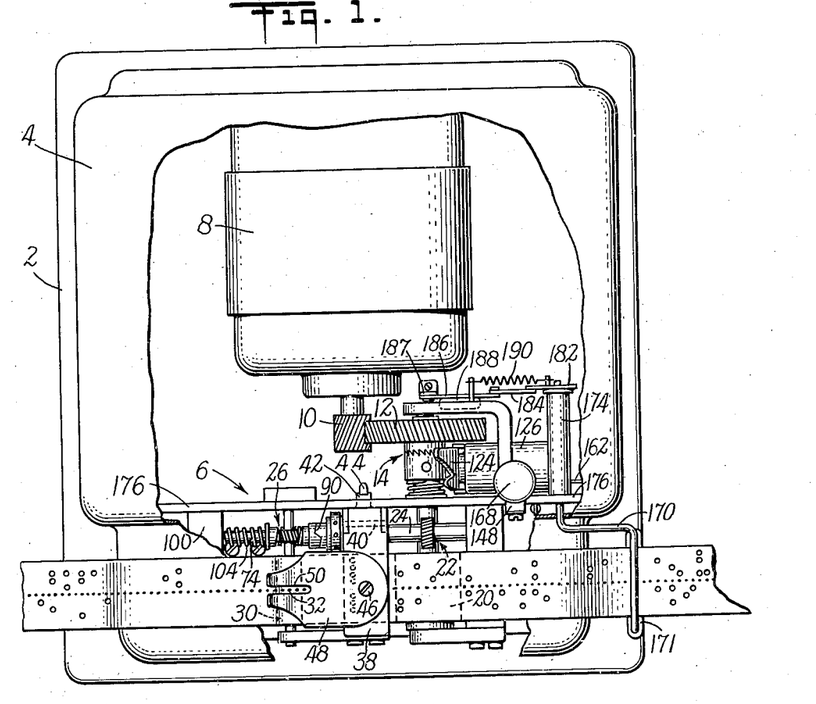
Figure 1 is a top plan view of one embodiment of the invention with the major portion of the casing and certain other parts broken away to show certain internal construction.
Figure 2:
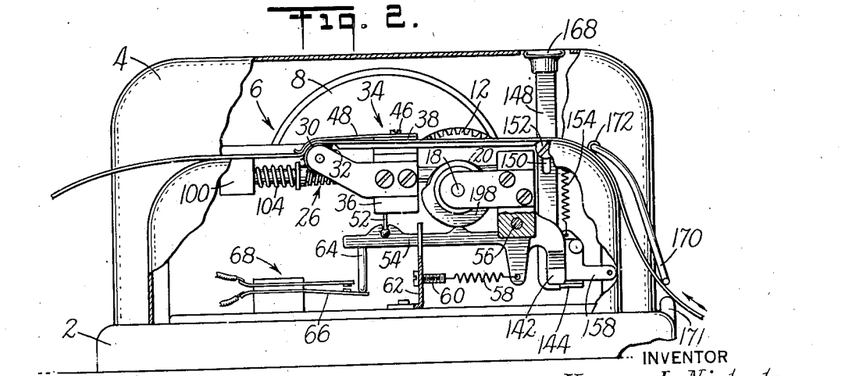
Figures 2 and 3 are front and side elevations, respectively, with parts broken away.
Figure 4:
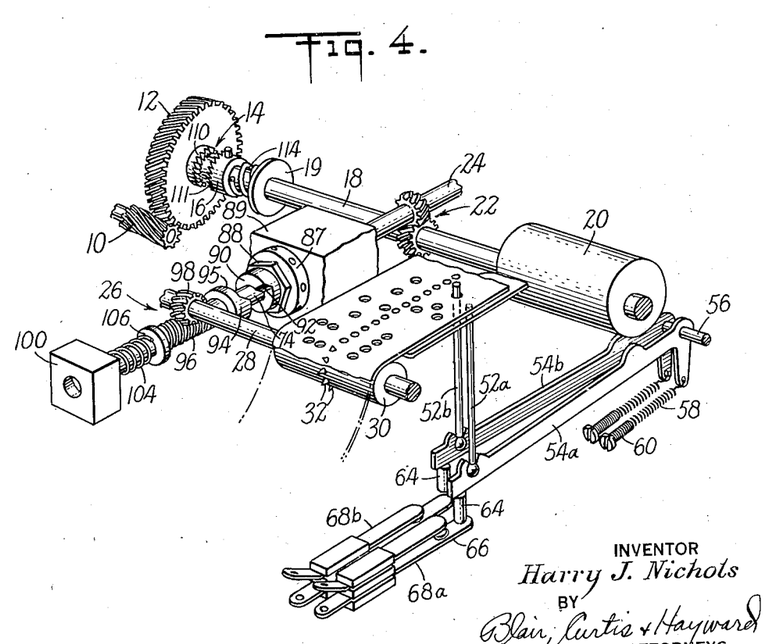
Figure 4 is a partially schematic view showing the tape drive and a portion of the reader assembly.
Figure 5:
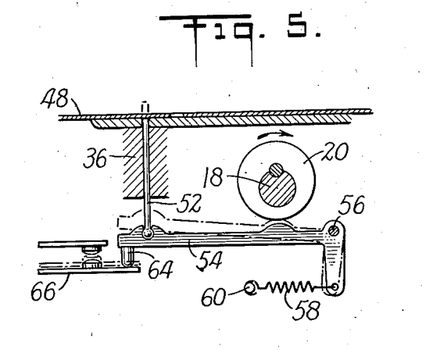
Figure 5 is a schematic view demonstrating the operation of one of the individual reader units.

Referring particularly to Figures 1 and 2 of the drawings, a square base 2 has a hood casing 4 which encloses the tape reader mechanism 6 and the electric driving motor 8. Casing 4 is hinged to base 2 at the rear side of the machine (the top of Figure 1) so that the casing may be swung back to give access to the internal parts of the machine. Motor 8 drives the mechanism through a pair of gears 10 and 12 and a clutch assembly 14, the details of which will be brought out below in connection with the discussion of Figures 7 and 8. At the left-hand side of Figure 3, rigidly attached to base 2 is a mounting bracket 176 which provides a mounting for many of the operating parts of the apparatus. As shown best in Figure 4, clutch assembly 14 has a driven clutch sleeve 16 which turns a shaft 18 upon which is mounted a cam 20 having a cam surface as shown in Figure 5. This cam transmits the operating movement to the seeker pin assembly in a manner to be more fully discussed below.

The tape (Figure 4) is driven from shaft 18 through a pair of meshing gears 22 driving a shaft 24 which drives an intermittent worm-feed 26. Worm-feed 26 transmits an intermittent movement to shaft 28 which carries a sprocket roll 30 over which the tape passes with the movement being transmitted to the tape by a plurality of sprocket teeth 32 engaging a row of feed holes at the center of the tape.

The tape passes from right to left through the machine (see Figures 1 and 2) and at the center of the machine passes the reading station 34. At the reading station the tape is held adjacent the upper surface of a pin block 36 by a hinged gate 38 (see also Figures 1 and 3) pivoted at 40. Gate 38 has a rear extension 42 which engages a detent on a spring 44 so positioned that when the gate is in the full line position of Figure 3 it is held in that position, and the tape is held in place; but the gate may be lifted to the broken-line position away from the tape and is held in this position by the detent. Referring again to Figures 1 and 2, rigidly clamped to the top of gate 38 by a screw 46 is a leaf-spring tape holder 48. When the gate is in the down position, as shown, the free end of the tape holder bears against the tape and holds it against sprocket roll 30 so that the tape is driven by engagement by the bases of teeth 32. Thus, the tape is driven by the firm pull of the teeth and is not torn. A slot 50 in holder 48 allows the sprocket teeth 32 to pass the holder without interference.

Slidably mounted in pin block 36 are seven seeker pins 52 (represented schematically in Figure 17 and designated 52a to 52f, respectively) which are normally held with their upper ends directly beneath the upper surface of block 36. Each of these pins is swively attached (see Figure 4) at its lower end to one of seven oscillating levers 54 (designated 54a to 54f, respectively) by a ball joint as shown and the levers are rockably mounted to rock individually on a pivot 56. Each lever is biased clockwise (Figure 2) by a tension spring 58 attached at one end to the lever and at the other end to an adjusting screw 60 threaded into a mounting plate 62 clamped to base 2. Plate 62 has an upward extension or comb with slots which guide oscillating levers 54. The free end of each of the oscillating levers 54a to 54f carries an insulated switch rod 64 which normally engages the lower leaf 66 of one of the six switches 68 (designated 68a to 68f, respectively) and holds the switch open. As will be explained more fully below, when a particular seeker pin and its oscillating lever move upwardly the corresponding switch 68 closes to produce one element of a particular code signal.

Accordingly, during the major portion of each revolution cam 20 engages the respective oscillating levers and holds the levers in a counter-clockwise position against the action of springs 58 so that the upper ends of the seeker pins are held below the tape and switches 68 are held open. However, at the time that the tape is stopped with a row of code holes at the reading station, cam 20 permits the oscillating levers to be swung clockwise by springs 58 so that the seeker pins move upwardly against the tape. There is a hole in gate 38 in alignment with each pin, and if a hole appears in the tape in alignment with a particular seeker pin, the end of the seeker pin moves through the tape. Thus, the oscillating lever attached to that particular pin is permitted to swing clockwise a sufficient distance to lift its switch rod 64 and the corresponding switch 68 closes. However, if no hole appears in the tape in alignment with a particular seeker pin, the movement of the seeker pin is arrested by the tape and the corresponding switch remains open. Thus, the presence of code holes in the tape is indicated by the closing of the corresponding switches, and a code signal is produced depending upon the particular switches closed.

As indicated above, the tape is fed by the intermittent worm-feed 26 which is driven by shaft 24 and which drives shaft 28 by means of a gear 98. Referring to the right-hand portion of Figure 9, the end of shaft 24 has a tongue 70 which fits in a notch 72 in the end of a worm shaft 74 so as to provide a slide coupling through which shaft 74 is driven by shaft 24. A sleeve 76 receives the adjacent ends of shafts 24 and 74 and provides a bearing support for the ends of the shafts. This entire assembly is journaled in a cam sleeve 88 which is snugly received in and is keyed to a threaded sleeve 87 which is adjustably carried in a threaded bore in block 89. Sleeve 88 has on its left-hand end a counter-feed cam surface 90 formed by a helical portion connected at its ends by a jump-off portion 92. Integral with shaft 74 is a cam flange 94 which has at the right a cam surface 95 mating cam surface 90. At the left of flange 94 shaft 74 has a worm 96 cut therein having the same pitch as the helical portions of cam surface 90. Worm 96 is meshed with a gear 98 keyed to shaft 28.

Figure 9:
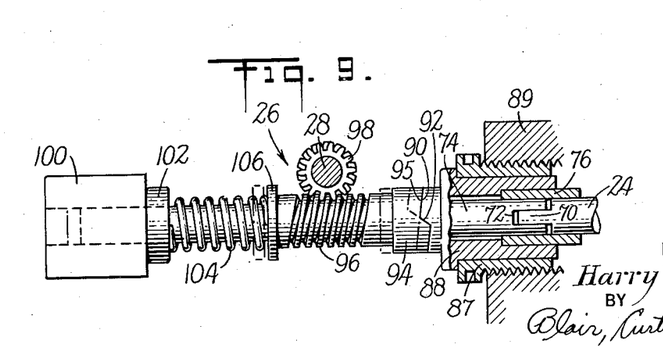
Figure 9 is a fragmentary view partially in section showing the intermittent drive mechanism.

The left-hand end of shaft 74 is carried in a bearing block 100 and adjacent the bearing block on the shaft is a thrust collar 102 against which a thrust spring 104 bears; the other end of spring 104 bears against a flange 106 integral with shaft 74. Thus, shaft 74 is biased to the right so that cam surface 95 is held against cam surface 90. Upon rotation of worm shaft 74 by shaft 24 (as indicated) the cam on shaft 74 rides to the left due to cam surface 95 riding on the stationary cam surface 90, and worm 96 turns in the teeth of gear 98 without turning the gear. However, when the jump-off portion 92 is reached by the corresponding portion of cam surface 95, worm shaft 74 is moved quickly to the right by spring 104 and this movement is transmitted by worm 96 to gear 98 so as to rotate the gear and shaft 28 counterclockwise through an arc equal to the spacing of the teeth on gear 98. This intermittent movement is transmitted to the tape by sprocket roll 30 with the result that the tape is advanced a distance equal to the spacing between adjacent rows of code holes. Accurate adjustment of the feed with respect to the reading operation is maintained by adjusting the threaded sleeve 87 in block 89.

Figure 7:
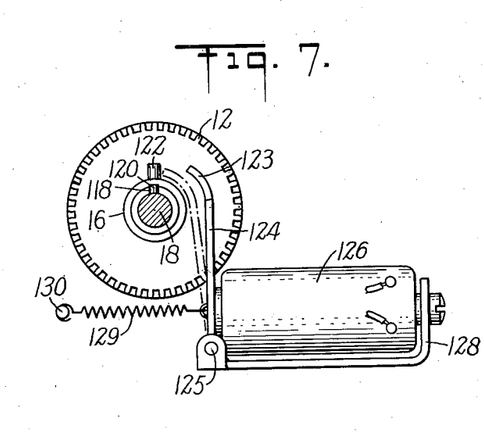
Figure 7 is a partially schematic front view of the clutch disengaging unit for stopping the reading operation.
Figure 8:
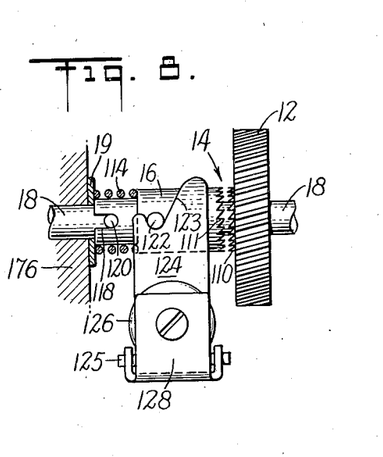
Figure 8 is a side view of the unit shown in Figure 7.

The solenoid-spring unit for operating clutch 14 is best shown in Figures 7 and 8. Gear 12 is mounted to rotate freely on the end of shaft 18 but is held from axial movement on the shaft. The hub of gear 12 has crown teeth 110 thereon which mate with crown teeth 111 on clutch sleeve 16 which is slidably mounted on shaft 18 and is urged to the right by a spring 114. The left-hand end of spring 114 bears against a washer 19 which rests on bracket 176. At its left-hand end sleeve 16 has a notch 118 in which is positioned the end of a pin 120 rigidly mounted in shaft 18 so that sleeve 16 and shaft 18 turn together but the sleeve may slide on the shaft. Sleeve 16 also carries a stop pin 122 which projects from the sleeve (see also Figure 7) and is adapted to engage a cam surface 123 on the upper end of a throw-out lever 124 pivoted at its lower end at 125 on a bracket 128. Lever 124 is normally held in the full-line or retracted position (Figure 7) by a normally energized solenoid 126 mounted on bracket 128. However, lever 124 is biased counterclockwise toward the broken-line position by a spring 129 attached at one end to the lever and at the other end to a pin 130 on the base of the machine. When it is desirable to disconnect clutch 14 solenoid 126 is deenergized with the result that spring 129 swings lever 124 to the intercepting position shown in broken lines in Figure 7. With lever 124 in this intercepting position the rotation of the clutch swings pin 122 against cam surface 123 (Figure 8) and the pin rides on the cam surface and slides sleeve 16 to the left to the position shown. This disengages the clutch so that gear 12 is driven idle on shaft 18. Furthermore, cam surface 123 has a reverse bend so that a groove is provided into which pin 122 slides after the clutch is disengaged. This stops rotation of shaft 18 in the predetermined position shown. Pin 122 is so located with respect to the low point on cam 20 that the seeker pins are withdrawn from the tape at the time shaft 18 reaches this predetermined position. When it is desirable to restart the reading operation solenoid 126 is energized again, lifting lever 124 to the full line position of Figure 7 and permitting spring 114 to re-engage the clutch.

Figure 10:
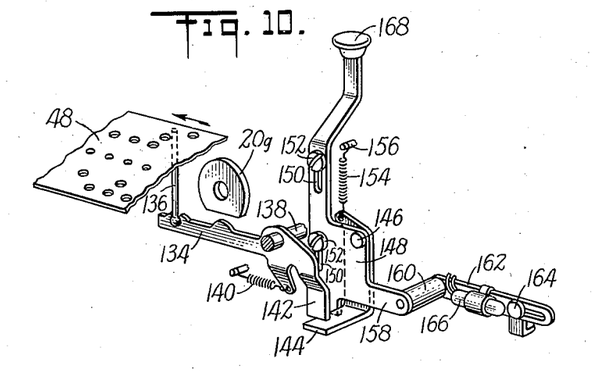
Figure 10 is a partially schematic view showing the auxiliary stop and restart mechanism.

As indicated above, the tape reader is provided with an automatic stop device which is adapted to stop the operation of the entire apparatus in response to the presence of a special code hole in the margin of the tape. This stop device is provided with a seeker pin and lever assembly similar to those described above for reading the signal code. This automatic stop device is shown partially in schematic form in Figure 10 and it appears in Figure 3 at the right-hand side of the six cam levers 54. Referring to Figure 10, a cam surface 20g which is formed on the end of cam 20 has riding thereon a cam lever 134 which carries a seeker pin 136.

Figure 3:
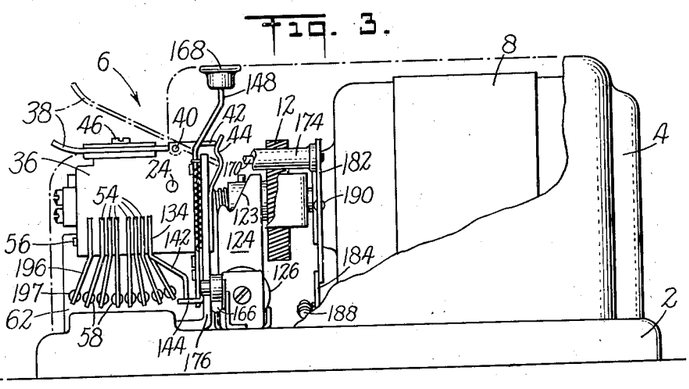
Figures 11, 12, 13, 14:
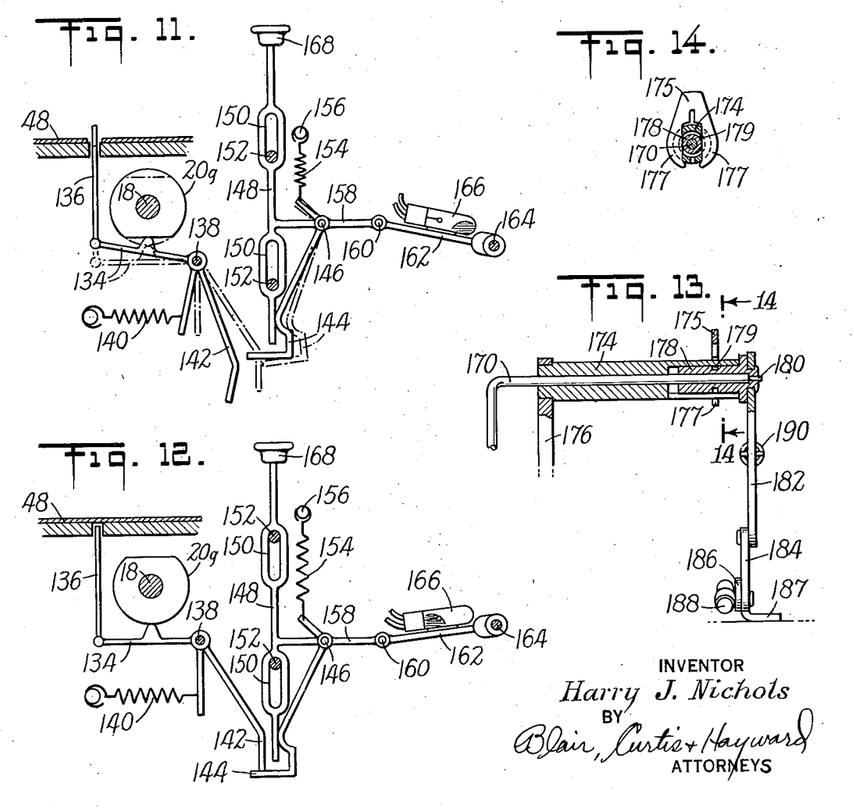
Figures 11 and 12 are views showing schematically the operation of the mechanism of Figure 10.
Figure 13 is a side view, partially in section, of the tape-controlled emergency stop mechanism.
Figure 14 is a section on the line 14—14 of Figure 13.

During each reading operation seeker pin 136 is moved toward a predetermined point adjacent the margin of the tape and if a hole appears there in the tape the end of the seeker pin is passed through the hole and cam lever 134 swings clockwise. Accordingly, cam lever 134 is rockably mounted on a pivot 138 and is biased clockwise by a spring 140 which is attached to bracket 62 (Figure 3). Lever 134 (Figure 10) has a latch extension 142 which is shown engaged by a trigger sear 144. Trigger sear 144 is in turn pivoted at 146 to a vertically slidable switch-operating member 148. Switch-operating member 148 has a pair of slots 150 thereon through which extend a pair of screws 152 mounted on the frame of the machine so that the switch-operating member has limited vertical movement. Trigger sear 144 is biased clockwise by a coil spring 154, the lower end of which is attached to the trigger sear and the upper end of which is held by a post 156 mounted on the frame of the machine. Spring 154 also tends to lift the switch-operating member so that when released the switch-operating member moves to the raised position of Figure 11. The switch-operating member has a horizontal arm 158 which is connected by a pivotal means 160 to the swinging end of a switch lever 162 pivoted at 164 and carrying a mercury switch 166. At its upper end, switch-operating member 148 has a push button 168 by which the member may be depressed from the position of Figure 11 to that of Figure 10. In Figures 10 to 12, switch lever 162 is shown at the right of pivotal means 160 whereas in a true showing of the structure the switch lever would be at the left of this pivotal means. However, the representation of Figures 10 to 12 is for the purpose of explaining the operation of the device and the position of the parts of the actual construction is shown in Figures 1 and 3. When desirable the arrangement of Figures 10 to 12 may be used without change.

The operation of the stop device is best understood by reference to the partially schematic showings of Figures 11 and 12. Referring particularly to Figure 12, when the apparatus is operating the tape 48 moves intermittently past the seeker pin 136 and the cam surface 20g permits spring 140 to swing the oscillating cam lever 134 clockwise during each reading operation. If no hole appears in the tape in alignment with seeker pin 136, the tape stops the pin and the oscillating cam lever remains substantially in the position shown; thus, the latch extension 142 remains on top of the trigger sear 144 with the result that the switch-operating member and its associated parts are held as indicated in Figure 10.

However, if a hole appears in the tape in alignment with the seeker pin during a particular reading operation the end of the seeker pin passes through the tape and the oscillating cam lever swings to the full line position of Figure 11 under the influence of spring 140. This releases trigger sear 144 from latch extension 142 and spring 154 pulls the switch-operating member 148 with its connected parts upwardly to the position represented in full lines in Figure 11. Thus, switch 166 is moved from the closed-switch position of Figures 10 and 12 to the open-switch position of Figure 11 with the result that the machine is stopped. However, there is sufficient rotation of cam surface 20g during the stopping of the machine to move the low portion of the cam surface away from the oscillating cam lever; thus, the oscillating cam lever is moved back to the position of Figure 12 (shown in broken lines in Figure 11) so that seeker pin 136 is withdrawn from the tape. In this position, the latch extension 142 moves against trigger sear 144 and swings the trigger sear counterclockwise against the action of spring 154 to the broken line position of Figure 11. The machine is restarted by pushing down on button 168 and thus depressing the switch-operating member. During this downward movement of the switch-operating member the tip of the trigger sear moves down along the latch extension 142 and thence beneath the latch extension to the position of Figure 12, whereby switch 166 is tilted to the closed-switch position.

Figure 15:
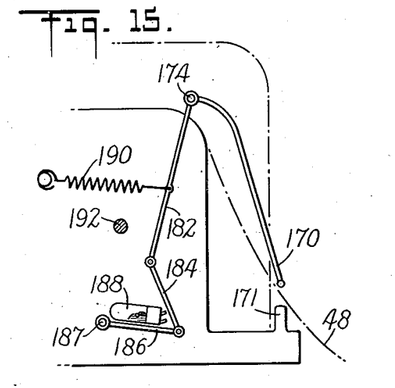
Figures 15 and 16 are views showing schematically the operation of the mechanism of Figure 13.
Figure 16:
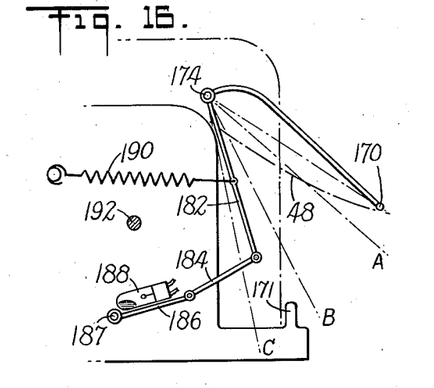

The mechanism referred to above for stopping the apparatus in the event that the tape becomes too taut or breaks or runs out is shown in Figures 1, 2, 13 and 14, and the operation is represented schematically in Figures 15 and 16. Referring to Figures 1 and 2, at the right-hand side of the machine the incoming run of tape passes over a tape guide 171 and under the lower end of a crank 170 which extends into the casing through a hole 172 at its upper end where it is rockably mounted.

Referring now to Figure 13, crank 170 extends into a fixed sleeve 174 which is mounted in bracket 176 on the base of the machine. The right-hand end of the crank extends into a hub 178 with the extreme end of the crank squared at 180 to transmit turning movement of the crank to the hub. Hub 178 has an annular groove 179 (see also Figure 14) into which the two side arms 177 of a clip fork 175 extend so as to hold sleeve 174 to hub 178. There are slots in the sides of sleeve 174 at the annular groove 179 through which the arms 177 project. Riveted to hub 178 is an operating arm 182 which projects downwardly (see Figures 13 and 15) and is attached at its lower end through a link 184 to a switch arm 186 (see also Figure 1) which is pivoted at 187 and carries a mercury switch 188, which is connected in the power circuit in series with mercury switch 166. Operating arm 182 is biased clockwise (Figure 15) by a coil spring 190 having one end attached to the operating arm 182 and the other end attached to the base of the machine.

As pointed out above, during operation the tape 48 passes between tape guide 171 and the lower end of crank 170, and the tape holds the members in the position represented in Figure 15 with switch 188 in its closed position. If the tape runs out or breaks, the crank is no longer held in the position shown with the result that spring 190 swings operating arm 182 to the left against a stop 192 and switch 188 is swung counterclockwise to its open position. Furthermore, if the tape becomes too taut the crank swings counterclockwise (see Figure 16) and the members assume the position represented in full lines with switch 188 again in its open position.

With this construction the crank is normally in the position of Figure 15 but it may swing upwardly (see Figure 16) to the line A without opening switch 188; however, once the switch is opened, it is not reclosed until the crank reaches the line B. Thus, as the crank is moving toward the full line position of Figure 16, the movement between the line A and the full line position is sufficient to cause switch 188 to open. When the tape is freed and is no longer taut a loop forms and the crank swings clockwise again toward the normal position and the switch is closed when the crank moves to the line B. In this manner, excessive starting and stopping of the reader is avoided. In the event that the tape runs out, when the end of the tape passes tape guide 171, spring 190 swings the crank clockwise to line C and this rocks switch arm 186 counterclockwise and opens the switch.

Figure 6:
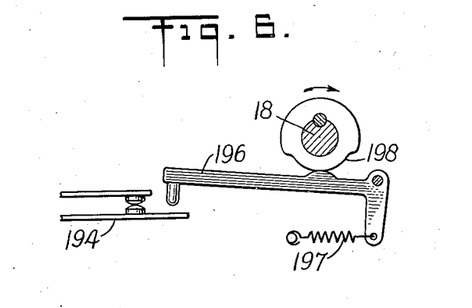
Figure 6 is a view similar to Figure 5 showing a signal control switch associated with the reader assembly.
Figure 17:
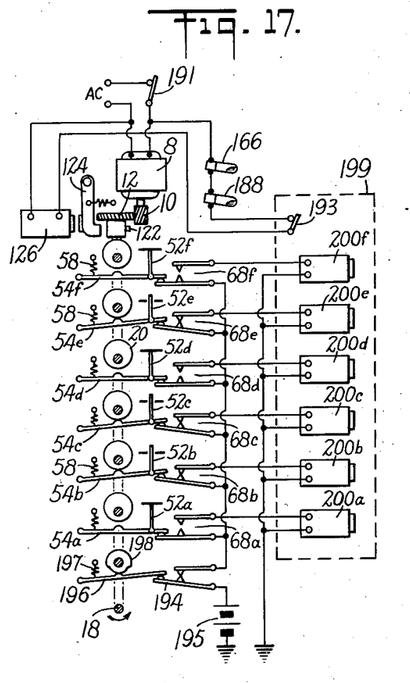
Figure 17 is a schematic showing of the reading assembly together with a wiring diagram of the electrical system; and, Figure 18 is a view similar to Figure 17 showing another similar system.

The illustrative embodiment of the invention is adapted for high speed operation and the signals are accurately timed with respect to both time of starting and duration. This accurate timing of the signals is provided by a breaker switch 194 (see Figure 6). As shown in Figure 17, switch 194 is in series with switches 68 and is closed for a specified portion of the time that the seeker pins are projected upwardly toward the tape. Thus, the closing of one or more of switches 68 during the reading of a specified code signal merely sets up the various signal circuits, and these signal circuits are completed at a specified time and for a specified duration by the closing of switch 194. Switch 194 (Figure 6) is operated by a breaker cam-lever 196 held by a spring 197 against a cam surface 198. The contour of cam surface 198 is such that switch 194 is closed and opened rapidly so that the signal circuits are completed and are broken again at a rapid rate. As shown in Figure 3, lever 196 is positioned at the left-hand side of cam levers 54 and (see Figure 2) cam 198 is an end portion of cam 20. However, for the purpose of showing the reader mechanism more clearly, lever 196 and its switch 194 are omitted from Figure 2.

The operation of this embodiment of the invention is best understood by referring to Figure 17 wherein various parts are represented schematically and a simplified circuit is shown. Power is supplied to motor 8 and the solenoid 126 through a manual switch 191, and an additional switch 193 is provided in the solenoid circuit in series with mercury switches 166 and 188 so that the solenoid can be deenergized manually without stopping the motor. A translator 199 includes six relays 200a to 200f, and causes the correct character to be typed on the automatic typewriter, or the code signal may be utilized as outlined above.

In the showing of Figure 17, solenoid 126 is energized and throw-out lever 124 is withdrawn from engagement with stop pin 122 so that cam shaft 18, cam 198 and eccentric cam 20 are being rotated by the motor. The low portion of cam 20 is presented to cam levers 54 and springs 58 have swung their levers 54 counterclockwise with the seeker pins 52 raised. Illustratively, the code signal being read is formed by code holes in alignment with seeker pins 52b, 52c, and 52e, and the ends of these three seeker pins have passed through their respective holes with the result that their switches 68b, 68c and 68e are closed. Furthermore, shortly after the closing of these switches, breaker lever 196 was moved upwardly by its spring 197 and its switch 194 was closed completing the signal circuits; that is, a circuit was completed from battery 195, through switches 194 and 68b to translator relay 200b and thence through ground to the other side of the battery. Simultaneously, similar circuits were completed through relays 200c and 200e.

Assuming that cam shaft 18 continues to rotate from the position indicated, cam surface 198 will first move lever 196 downwardly thereby opening switch 194 and breaking the signal circuits; thereafter cam 20 will move levers 54 down sufficiently to open the switches 68b, 68c and 68e. After the seeker pins have been withdrawn and before they are moved toward the tape again, the intermittent worm-feed (Figure 4) advances the tape so that the next row of code holes is at the reading station. Thus, the reading cycle is completed and may proceed at a high rate such as, for example, twelve hundred reading operations or two hundred words per minute.

In Figure 17, the mechanisms for operating the auxiliary stop switches 166 and 188 are not represented, but it is understood from the previous discussion that these switches are operated under predetermined conditions. For example, referring to Figure 10, the seeker pin 136 is moved toward the tape simultaneously with the corresponding movement of the seeker pins 52 and if a code hole appears in alignment with seeker pin 136, the apparatus is stopped by the opening of switch 166 and the deenergization of solenoid 126; this results in the disengagement of clutch 14 and the apparatus remains stationary until push button 168 is depressed, reclosing switch 166. If the tape runs out, breaks or becomes too taut during the operation of the machine, switch 188 is opened and the reading operation is stopped until tape at the proper tension is supplied to the machine.

With some signal code systems, each code signal is a series of individual signals sequentially introduced into a single circuit, and the various code signals are all transmitted to a single relay which produces the effect desired. Such a system wherein the parts are similar to the corresponding parts in Figure 17 is represented schematically in Figure 18. Accordingly, a cam 220 has the low portions of the various cam surfaces which are engaged by the cam levers 54 spaced angularly about the cam; thus, the seeker pins 52 are moved upwardly toward the tape one at a time, and a hole in the tape is evidenced by the closing of the switch at that particular time. In order to indicate the start of a code signal the breaker switch of Figure 17 is replaced with a starting switch 204 which is normally closed and at the beginning of each revolution of the cam is opened to indicate to relay 202 that a code signal is to follow. Starting switch 204 is operated by a cam lever 208 which is held against a cam surface 206 by a spring 210.

Figure 18:
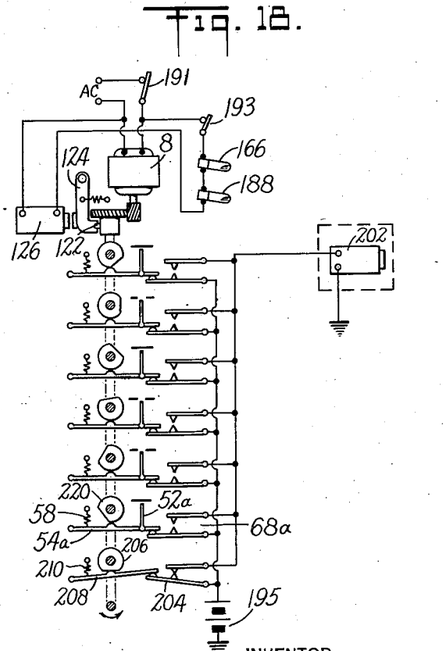

During operation, the tape is advanced with a row of holes at the reading zone with switch 204 closed; switch 204 is then opened to designate the starting of a reading cycle. The various seeker pins starting with pin 52a are projected upwardly in succession so that for each hole that appears in the tape the corresponding switch is closed and the signal circuit is completed at a specific time after the opening of switch 204. These signals are transmitted to live relay 202 and at the end of the signal period switch 204 is closed again. This embodiment therefore produces code signals adapted to operate teleprinters of the start-stop type.

As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. In a tape reader of the character where the tape is moved through a reading zone, a switch which is operated to stop the operation of the reader, a lever providing a mounting for said switch, a vertically slidable operating means connected to said lever, a trigger sear mounted on said operating means, a feeler lever having an arm which is adapted to hold said trigger sear in a first position whereby said operating means is held in its depressed position, and means to bias said feeler lever periodically whereby it tends to move to a second position to release said trigger sear and permit said operating means to move upwardly.

2. In a tape reader, the combination of, a seeker pin assembly including a seeker pin and lever means to project the pin during each operation toward the tape to detect the presence of a code hole therein, a sliding member which is slidable between a first position and a second position and which is biased toward said first position, a trigger sear carried by said sliding member and adapted to be engaged by said lever means to hold said sliding member in said second position away from said first position, and a switch connected to be operated by the movement of said sliding member.

3. Unitary apparatus for reading code hole designations in a record tape and comprising, in combination, power means providing a source of rotary motion; tape feeding means operable to advance said tape intermittently to present said code hole designations successively at a reading zone and including a feed sprocket and an intermittent motion gear train providing a positive driving connection between said sprocket and said power means; means operable between intermittent advancing operations of said tape feeding means for sensing the code hole designations at the reading zone and comprising a plurality of seeker pins for sensing the code holes, a plurality of levers each carrying one of said seeker pins, individual resilient means acting on said levers and operable to move each lever and its related seeker pin from an initial position toward the tape and into sensing relation with respect to the portion thereof at the reading zone, and a first rotating cam means driven by said power means and contacting all of said levers and coacting cyclically with said levers to permit said levers to be moved simultaneously toward said tape by said resilient means and thereafter to restore said levers and pins to their said initial position; a plurality of signal switches operated, respectively, by said levers, each signal switch being so arranged with respect to its related lever that extended movement of such lever, resulting from its related seeker pin sensing a code hole in the tape, closes such switch; a cam follower; a common control switch actuated by said follower; a second rotating cam means driven by said power means synchronously with said first cam means and operating said cam follower to close said common switch after the time for closing said signal switches and to open said common switch before the opening of such signal switches; and electrical circuit means including a source of electrical energy, and circuit wires connecting said signal switches in parallel with one another and in series with said common control switch.

4. Unitary apparatus for reading code hole designations in a record tape and comprising, in combination, power means providing a source of rotary motion; tape feeding means driven by said power means and operable to advance said tape intermittently to present said code hole designations successively at a reading zone; means operable between intermittent advancing operations of said tape feeding means for sensing the code hole designations at the reading zone and comprising a plurality of seeker pins for sensing the code holes, a plurality of levers each carrying one of said seeker pins, individual resilient means acting on said levers and operable to move each lever and its related seeker pin from an initial position toward the tape and into sensing relation with respect to the portion thereof at the reading zone, and a first rotating cam means driven by said power means and coacting cyclically with said levers to permit said levers to be moved simultaneously toward said tape by said resilient means and thereafter to restore said levers and pins to their said initial position; a plurality of signal switches operated, respectively, by said levers, each signal switch being so arranged with respect to its related lever that extended movement of such lever, resulting from its related seeker pin sensing a code hole in the tape, closes such switch; a cam follower; a common control switch actuated by said follower; a second rotating cam means driven by said power means synchronously with said first cam means and operating said cam follower to close said common switch after the time for closing said signal switches and to open said common switch before the opening of the said signal switches; an electrical circuit means including a source of electrical energy, and circuit wires connecting said signal switches in parallel with one another and in series with said common control switch.

5. Unitary apparatus for reading code hole designations in a record tape and comprising, in combination, power means including a continuously rotating driving element; a rotary driven element; adjustable clutch mechanism for positively connecting and disconnecting said driving and driven elements and being adjustable to first and second adjusted conditions and being operable when in its said first adjusted condition to provide positive driving engagement between said driving and driven elements and being operable when in its said second adjusted condition to disengage said driving element from said driven element; means for adjusting said clutch mechanism to its said first adjusted condition; tape feeding means operable to advance said tape intermittently to present said code hole designations successively at a reading zone and including a feed sprocket and an intermittent motion gear train providing a positive driving connection between said sprocket and said driven element; means operable between the intermittent advancing operations of said tape feeding means, for sensing the code hole designations at the reading zone and comprising a plurality of seeker pins for sensing the code holes, a plurality of levers each carrying one of said seeker pins, individual resilient means acting on said levers and operable to move each lever and its related seeker pin from an initial position toward the tape and into sensing relation with respect to the portion of said tape at the reading zone, and rotating cam means operated by said driven element and contacting all of said levers and coacting cyclically with said levers to permit said levers to be moved toward said tape by said resilient means and thereafter to restore said levers and pins to their said initial positions; and means for adjusting said clutch mechanism to its said second adjusted condition and for stopping said driven element in a position where said seeker pins are withdrawn from sensing relation with respect to said tape.

6. Unitary apparatus for reading code hole designations in a record tape and comprising, in combination, power means including a continuously rotating driving element; a rotary driven element; adjustable clutch mechanism for positively connecting and disconnecting said driving and driven elements and being adjustable to first and second adjusted conditions and being operable when in its said first adjusted condition to provide a positive driving engagement between said driving and driven elements and being operable when in its said second adjusted condition to disengage said driving and driven elements; means for adjusting said clutch mechanism to its said first adjusted condition; tape feeding means operable to advance said tape intermittently to present said code hole designations successively at a reading zone and including a feed sprocket and an intermittent motion gear train providing a positive driving connection between said sprocket and said driven element; means operable between the intermittent advancing operations of said tape feeding means, for sensing the code hole designations at the reading zone and comprising a plurality of seeker pins for sensing the code holes, a plurality of levers each carrying one of said seeker pins, individual resilient means acting on said levers and operable to move each lever and its related seeker pin from an initial position toward the tape and into sensing relation with respect to the portion of said tape at the reading zone, and rotating cam means operated by said driven element and contacting all of said levers and coacting cyclically with said levers to permit said levers to be moved toward said tape by said resilient means and thereafter to restore said levers and pins to their said initial positions; a plurality of signal switches operated, respectively, by said levers and each said switch being so arranged with respect to its related lever that extended movement of such lever, resulting from its related seeker pin sensing a code hole, actuates such switch; and means for adjusting said clutch mechanism to its said second adjusted condition and for stopping said driven element in a position where said seeker pins are withdrawn from sensing relation with respect to said tape.

7. Unitary apparatus for reading code hole designations in a record tape and comprising, in combination, power means including a continuously rotating driving element; a rotary driven element; adjustable clutch mechanism for positively connecting and disconnecting said driving and driven elements and being adjustable to first and second adjusted conditions and being operable when in its said first adjusted condition to provide positive driving engagement between said driving and driven elements and being operable when in its said second adjusted condition to disengage said driving and driven elements; means for adjusting said clutch mechanism to its said first adjusted condition; tape feeding means operated by said driven element and operable to advance said tape intermittently to present said code hole designations successively at a reading zone; means operable between the intermittent advancing operations of said tape feeding means, for sensing the code hole designations at the reading zone and comprising a plurality of seeker pins for sensing the code holes, a plurality of levers each carrying one of said seeker pins, individual resilient means acting on said levers and operable to move each lever and its related seeker pin from an initial position toward the tape and into sensing relation with respect to the portion of said tape at the reading zone, and rotating cam means operated by said driven element and contacting all of said levers and coacting cyclically with said levers to permit said levers to be moved toward said tape by said resilient means and thereafter to restore said levers and pins to their said initial positions; a plurality of signal switches operated, respectively, by said levers and each said switch being so arranged with respect to its related lever that extended movement of such lever, resulting from its related seeker pin sensing a code hole, actuates such switch; and means for adjusting said clutch mechanism to its said second adjusted condition and for stopping said driven element in a position where said seeker pins are withdrawn from sensing relation with respect to said tape.

8. Unitary apparatus for reading code hole designations in a record tape including a special hole designation signifying a stop operation, and said apparatus comprising, in combination, power means including a continuously rotating driving element; a driven element; adjustable clutch mechanism for positively connecting and disconnecting said driving and driven elements and being adjustable to first and second adjusted conditions and being operable when in its said first adjusted condition to provide positive driving engagement between said driving and driven elements and being operable when in its said second adjusted condition to disengage said driving and driven elements; means for adjusting said clutch mechanism to its said first adjusted condition; tape feeding means operated by said driven element and operable to advance said tape intermittently to present said code hole designations successively at a reading zone; means operable between intermittent advancing operations of said tape feeding means for sensing the code hole designations at the reading zone and comprising a plurality of seeker pins for sensing the code holes and including a seeker pin for sensing said special stop hole designation, a plurality of levers each carrying one of said seeker pins, resilient means acting on said levers and operable to move each lever and its related seeker pin from an initial position toward said tape and into sensing relation with respect to the portion of said tape at the reading zone, and rotating cam means operated by said driven element and contacting all of said levers and coacting cyclically with said levers to permit said levers to be moved toward said tape by said resilient means and thereafter to restore said levers and pins to their said initial positions; and means operable in response to the sensing of said special stop hole for adjusting said clutch mechanism to its said second adjusted condition and for stopping said driven element in a position where the seeker pins are withdrawn from sensing relation with respect to said tape.

HARRY J. NICHOLS.

REFERENCES CITED

The following references are of record in the file of this patent:

UNITED STATES PATENTS

| Number | Name | Date |
| --- | --- | --- |
| 1,542,779 | Peterman | June 16, 1925 |
| 1,661,012 | Pfannenstiehl | Feb. 28, 1928 |
| 1,837,237 | Shangle | Dec. 22, 1931 |
| 1,894,980 | Creed et al. | Jan. 24, 1933 |
| 1,912,183 | Dirkes et al. | May 30, 1933 |
| 2,010,158 | Kleinschmidt et al. | Aug. 6, 1935 |
| 2,017,087 | Ackell et al. | Oct. 15, 1935 |
| 2,116,549 | Zenner | May 10, 1938 |
| 2,160,463 | Spencer | May 30, 1939 |
| 2,268,203 | Carpenter et al. | Dec. 30, 1941 |
| 2,296,845 | Goetz | Sept. 29, 1942 |
| 2,300,050 | Leonard et al. | Oct. 27, 1942 |
| 2,358,375 | Bacon et al. | Sept. 19, 1944 |
| 2,379,865 | Connery et al. | July 10, 1945 |